(12) United States Patent
Otawa et al.

(10) Patent No.: US 12,741,322 B2
(45) Date of Patent: Sep. 22, 2026

(54) ADDITIVE AND SUBTRACTIVE MANUFACTURING MACHINE

(71) Applicant: DMG MORI CO., LTD., Nara (JP)

(72) Inventors: Takeshi Otawa, Nara (JP); Syuichi Nishi, Nara (JP)

(73) Assignee: DMG MORI CO., LTD., Nara (JP)

( * ) Notice: Subject to any disclaimer, the term of this patent is extended or adjusted under 35 U.S.C. 154(b) by 939 days.

(21) Appl. No.: 17/919,899

(22) PCT Filed: Apr. 24, 2020

(86) PCT No.: PCT/JP2020/017781
§ 371 (c)(1),
(2) Date: Oct. 19, 2022

(87) PCT Pub. No.: WO2021/215000
PCT Pub. Date: Oct. 28, 2021

(65) Prior Publication Data

US 2023/0158574 A1 May 25, 2023

(51) Int. Cl.

| | |
|---|---|
| ***B22F 12/50*** | (2021.01) |
| ***B22F 10/28*** | (2021.01) |
| ***B22F 12/00*** | (2021.01) |
| ***B33Y 30/00*** | (2015.01) |
| *B22F 10/66* | (2021.01) |

(52) U.S. Cl.
CPC .............. *B22F 12/50* (2021.01); *B22F 10/28* (2021.01); *B22F 12/222* (2021.01); *B22F 12/224* (2021.01); *B33Y 30/00* (2014.12); *B22F 10/66* (2021.01)

(58) Field of Classification Search
CPC ...... B22F 12/50; B22F 12/222; B22F 12/224; B22F 10/28; B22F 10/25; B22F 12/226; B22F 12/38; B22F 2003/247; B22F 10/66; B33Y 30/00
See application file for complete search history.

(56) References Cited

FOREIGN PATENT DOCUMENTS

| | | | |
|---|---|---|---|
| JP | 2003089024 A | | 3/2003 |
| JP | 2005059114 A | * | 3/2005 |
| JP | 2017189843 A | * | 10/2017 |

* cited by examiner

*Primary Examiner* — John J Norton
*Assistant Examiner* — Dilnessa B Belay
(74) *Attorney, Agent, or Firm* — IP Business Soultions, LLC.

(57) ABSTRACT

A processing machine includes a splash guard that defines and forms a processing area, a tool spindle that is movable in a Z-axis direction and a Y-axis direction inside the processing area, an additive-manufacturing head connected to the tool spindle, and a line body that extends from the additive-manufacturing head, is drawn from an inside of the processing area to an outside, and supplies material powder and a laser beam to the additive-manufacturing head. A maximum movement amount of the tool spindle in the Y-axis direction is shorter than a maximum movement amount of the tool spindle in the Z-axis direction. A drawing direction of the line body from the inside to the outside of the processing area is a direction intersecting the Z-axis direction in top view.

10 Claims, 11 Drawing Sheets

163
123
121
122
503
504
124
131
132
133
320
210(211)
136
325
X
Y
Z

OUTSIDE PROCESSING AREA
INSIDE PROCESSING AREA
335
332
333
323
526
221
334
521
211q
210
351
331
XII
352
360
323
312
320
210(211)
311
323
321
323
322
131
522
336
154
370
XI
156
123
155
155
121
504
163
132
133
325
211p
136
341
342
XIV
X
Y
Z 320
522
323
323
323
210(211)
323
370
521
336
321
323
382
380
XIII
381
211q
360
311
312
156
154
162
335
332
526
221
333
331
334
X
Y
Z 360
221
533
363
362
361
532
531
312
364
534
311
X
Y
Z

ADDITIVE AND SUBTRACTIVE MANUFACTURING MACHINE

TECHNICAL FIELD

The present invention relates to a processing machine.

BACKGROUND ART

For example, Japanese Patent Laying-Open No. 2017-189843 (PTL 1) discloses a processing machine including a subtractive-manufacturing head, an additive-manufacturing head connected to the subtractive-manufacturing head, and a cable supplying material powder and a laser beam to the additive-manufacturing head.

CITATION LIST

Patent Literature

PTL 1: Japanese Patent Laying-Open No. 2017-189843

SUMMARY OF INVENTION

Technical Problem

In the processing machine disclosed in PTL 1 described above, tire additive-manufacturing head is mounted on the subtractive-manufacturing head (tool spindle) during the additive manufacturing for a workpiece, so that the additive-manufacturing head moves integrally with the subtractive-manufacturing head within a processing area. In the processing machine having such the configuration, because the additive-manufacturing bead is not directly connected to a splash guard defining and forming the processing area, a cable forming a supply path of the material powder and the laser beam is required to be connected to the additive-manufacturing head and to be drawn from an inside of the processing area to an outside.

However, depending on a drawing direction of the cable from the inside to the outside of the processing area, an overall length of the cable extending in the processing area becomes longer as the additive-manufacturing head moves in the processing area. In this case, there is some possibility of greatly deflecting the cable in the processing area by its own weight.

An object of the present invention is to solve the above problems, and to provide a processing machine that prevents generation of the deflection in a line body for supplying the material powder and the laser beam to the additive-manufacturing head in the processing area.

Solution to Problem

A processing machine according to the present invention is a processing machine capable of performing additive manufacturing and subtractive manufacturing for a workpiece. The processing machine includes a splash guard that defines and forms a processing area, a tool spindle that holds the rotating tool for the subtractive manufacturing for the workpiece and is movable inside the processing area in an axial direction of a first axis parallel to a horizontal direction and an axial direction of a second axis parallel to the horizontal direction and orthogonal to the first axis, an additive-manufacturing head that is connected to the tool spindle, discharges material powder to the workpiece, and irradiates the workpiece with a laser beam, and a line body that extends from the additive-manufacturing head, is drawn from the inside to the outside of the processing area, and supplies the material powder and the laser beam to the additive-manufacturing head. A maximum movement amount of the tool spindle in the axial direction of the second axis is shorter than a maximum movement amount of the tool spindle in the axial direction of the first axis. The drawing direction of the line body from the inside to the outside of the processing area is a direction intersecting the axial direction of the first axis in top view.

According to the processing machine configured as described above, while the drawing direction of the line body from the inside to the outside of the processing area is the direction intersecting the axial direction of the first axis in top view, the maximum movement amount of the tool spindle in the axial direction of the second axis orthogonal to the first axis is shorter than the maximum movement amount of the tool spindle, in the axial direction of the first axis, for this reason, even when the additive-manufacturing head is moved in the axial direction of the second axis together with the tool spindle, a total length of the line body extending in the processing area can be shortened as compared with the configuration in which the drawing direction of the line body is parallel to the axial direction of the first axis in top view. Thus, generation of deflection in the line body in the processing area can be prevented.

Preferably, the drawing direction of the line body from the inside to the outside of the processing area is a direction orthogonal to the axial direction of the first axis in top view.

According to the processing machine configured as described above, when the additive-manufacturing head is moved in the axial direction of the second axis together with the tool spindle, the overall length of the line body extending in the processing area can be further shortened.

Preferably, the processing machine further includes a workpiece spindle that holds the workpiece and rotates the workpiece about a rotation axis parallel to the first axis.

According to the processing machine configured as described above, the drawing direction of the line body from the inside to the outside of the processing area is the direction intersecting with the axial direction of the rotation axis of the workpiece in the workpiece spindle, so that a path of the line body in the processing area can be moved away from the workpiece spindle or the workpiece held by the workpiece spindle. Accordingly, interference between the line body and the workpiece spindle or the workpiece held by the workpiece spindle can be prevented.

Preferably, the processing machine further includes a support that supports the line body outside the processing area and is movable in the axial direction of the first axis.

According to the processing machine configured as described above, the support that supports the line body outside the processing area can be moved in the axial direction of the first axis together with the additive-manufacturing head that moves in the axial direction of the first axis inside the processing area. Accordingly, an excessive load can be prevented from being applied to the line body between the inside and the outside of the processing area.

Preferably, the processing machine further includes a first guide mechanism and a second guide mechanism that are provided apart from each other in the axial direction of the second axis and guide the support along the axial direction of the first axis.

According to the processing machine configured as described above, the support can be smoothly moved in the axial direction of the first axis by the first guide mechanism and the second guide mechanism.

Preferably, the additive-manufacturing head is detachably provided with respect to the tool spindle. The processing machine further includes a coupling mechanism that is operable between a first state in which the tool spindle and the support are coupled to each other by the coupling mechanism when the additive-manufacturing head is mounted on the tool spindle and the additive manufacturing for the workpiece is performed, and a second state in which the coupling between the tool spindle and the support is released when the additive-manufacturing head is removed from the tool spindle and the subtractive manufacturing for the workpiece is performed.

According to the processing machine configured as described above, the tool spindle and the support are coupled by the coupling mechanism during the additive manufacturing for the workpiece, so that the support can be moved integrally with the tool spindle and the additive-manufacturing head in the axial direction of the first axis with a simple configuration. Furthermore, when the coupling between the tool spindle and the support is released by the coupling mechanism during the subtractive manufacturing for the workpiece, the subtractive manufacturing for the workpiece can be performed by the tool spindle separated from the support and the additive-manufacturing head.

Preferably, the processing machine further includes a tension applying mechanism that is mounted on the support and applies tension to the line body in a direction away from the additive-manufacturing head.

According to the processing machine configured as described above, by applying the tension to the line body by the tension applying mechanism, the generation of the deflection of the line body in the processing area can be more effectively prevented.

Preferably, the tool spindle is further movable in an axial direction of a third axis parallel to the vertical direction. The processing machine further includes a first guide member that is connected to the additive-manufacturing head so as to be able to revolve about a first revolving axis parallel to the first axis, is connected to the support so as to be able to revolve about a second revolving axis parallel to the first axis, and guides the line body between the additive-manufacturing head and the support.

According to the processing machine configured as described above, when the additive-manufacturing head moves in a second axis-third axis plane, the first guide member revolves about the first revolving axis with respect to the additive-manufacturing head and revolves about the second revolving axis with respect to the support. Accordingly, a routing path of the line body between the additive-manufacturing head and the support smoothly changes in accordance with the movement of the additive-manufacturing head, so that application of an excessive load to the line body can be prevented.

Preferably, the first guide member has an expansion and contraction mechanism that expands and contracts such that the distance between the first revolving axis and the second revolving axis changes.

According to the processing machine configured as described above, when the additive-manufacturing bead moves in the second axis-third axis plane, the expansion and contraction mechanism of the first guide member expands and contracts such that the distance between the first revolving axis and the second revolving axis changes. Accordingly, application of an excessive load to the line body can be more effectively prevented.

Preferably, the tool spindle is turnable about a turning axis parallel to the axial direction of the second axis. The processing machine further includes a second guide member that is provided between the additive-manufacturing head and the first guide member on a path on which the line body is routed and that guides the line body extending from the additive-manufacturing head along a circumferential direction of the turning axis. The second guide member revolves relative to the tool spindle about the turning axis so as to maintain a posture of the turning axis in a circumferential direction during the turning of the tool spindle.

According to the processing machine configured as described above, the routing path of the line body extending along the circumferential direction of the turning axis is kept constant even when the tool spindle turns, so that the application of the excessive load to the line body can be prevented.

Advantageous Effects of Invention

As described above, according to the present invention, it is possible to provide the processing machine that prevents the generation of the deflection in the line body for supplying the material powder and the laser beam to the additive-manufacturing head in the processing area can be prevented.

DESCRIPTION OF EMBODIMENT

Figure 1:
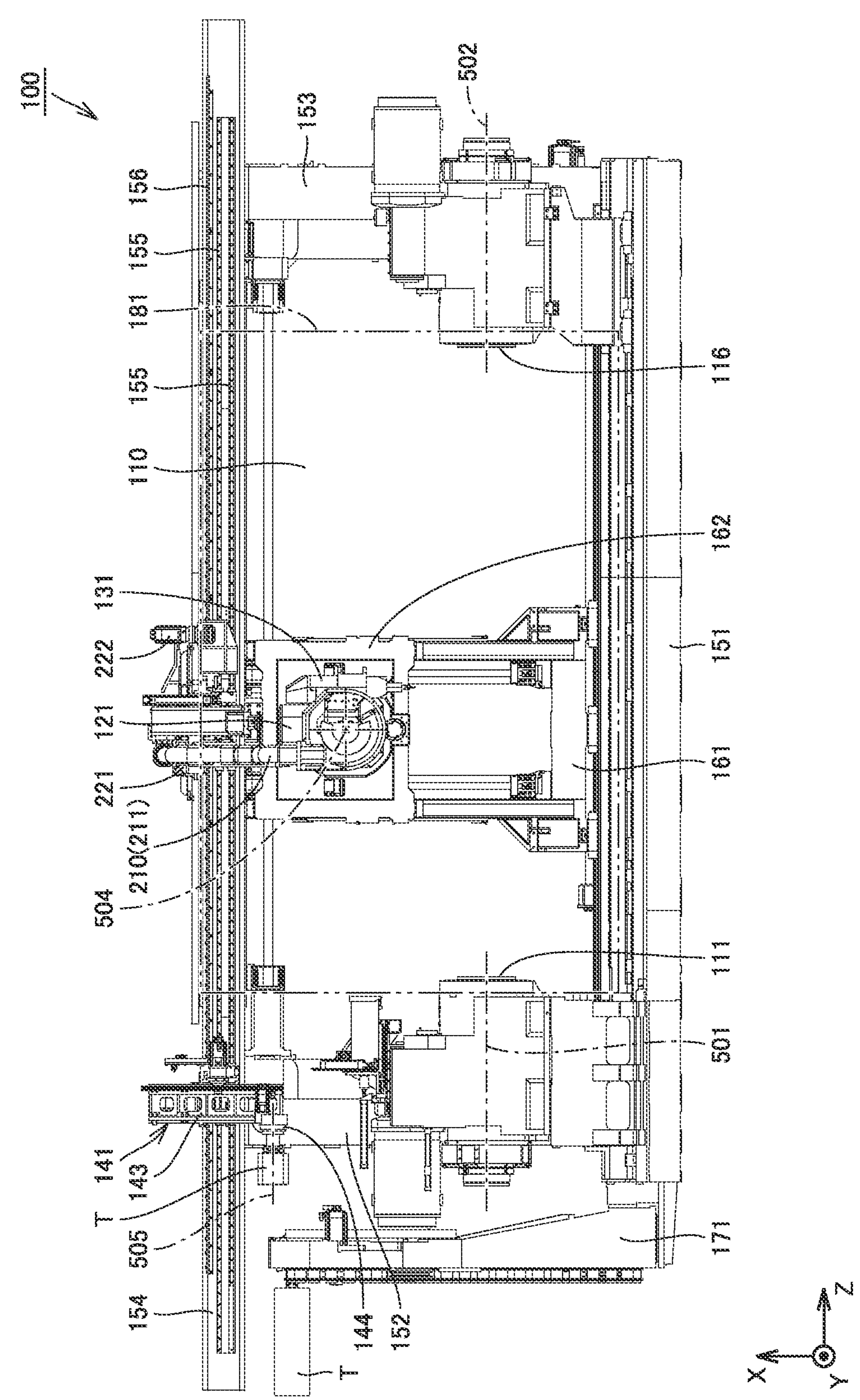
FIG. 1 is a front view illustrating a processing machine according to an embodiment of the present invention.

An embodiment of the present invention will be described with reference to the drawings. In the drawings referred to below, the same or corresponding member is denoted by the same reference numeral.

Figure 2:
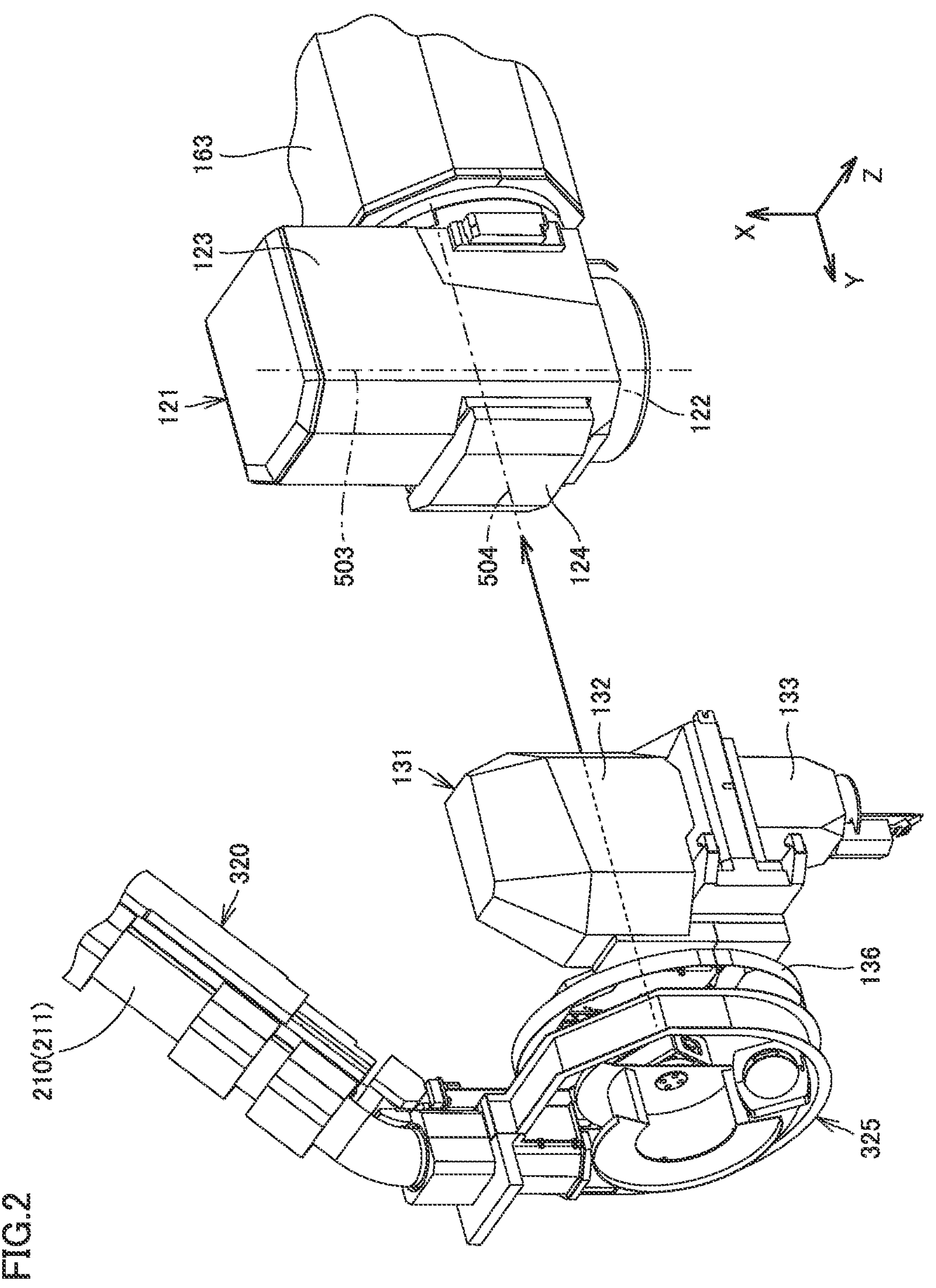
FIG. 2 is a perspective view illustrating attachment and detachment of a tool spindle and an additive-manufacturing head in the processing machine in FIG. 1.

FIG. 1 is a front view illustrating a processing machine according to an embodiment of the present invention. In FIG. 1, an inside of the processing machine is illustrated by seeing through a cover body having an appearance of the processing machine. FIG. 2 is a perspective view illustrating attachment and detachment of a tool spindle and an additive-manufacturing head in the processing machine in FIG. 1.

Referring to FIGS. 1 and 2, a processing machine 100 is an AM/SM hybrid processing machine capable of performing additive manufacturing (AM) processing for a workpiece and subtractive manufacturing (SM) processing for a workpiece. Processing machine 100 has a turning function using a stationary tool and a milling function using a rotating tool as a function of SM processing.

Processing machine 100 is a numerically control (NC) processing machine in which various operations for workpiece processing are automated by numerical control of a computer.

In the present specification, an axis parallel to a left-right direction (width direction) of processing machine 100 and extending in a horizontal direction is referred to as a "Z-axis (first axis)", an axis parallel to a front-rear direction (depth direction) of processing machine 100 and extending in the horizontal direction is referred to as a "Y-axis (second taxis)", and an axis extending in a vertical direction is referred to as an "X-axis". A right direction in FIG. 1 is referred to as "+Z-axis direction", and a left direction is referred to as "−X-axis direction". In FIG. 1, a front direction of a paper surface is referred to as a "+Y-axis direction", and a back direction is referred to as a "−Y-axis direction". In FIG. 1, an upward direction is referred to as a "+X-axis direction", and a downward direction is referred to as a "−X-axis direction". The X-axis, the Y-axis, and the Z-axis are three axes orthogonal to each other.

First, an overall structure of processing machine 100 will be described. Processing machine 100 includes a splash guard 181. Splash guard 181 defines and forms a processing area 110 where the workpiece is processed.

Processing machine 100 further includes a bed 151, a first workpiece spindle 111, a second workpiece spindle 116, and a tool rest (not illustrated).

Bed 151 is a base member supporting first workpiece spindle 111, second workpiece spindle 116, the tool rest, and the like, and is installed on an installation surface of a factory or the like.

First workpiece spindle 111 and second workpiece spindle 116 are disposed opposite to each other in the Z-axis direction. First workpiece spindle 111 and second workpiece spindle 116 are configured to be able to hold the workpiece. A chuck mechanism (not illustrated) detachably holding the workpiece is provided in first workpiece spindle 111 and second workpiece spindle 116. First workpiece spindle 111 mainly rotates the held workpiece about a rotation axis 501 parallel to the Z-axis during turning of the workpiece using a fixed tool. Second workpiece spindle 116 mainly rotates the held workpiece about a rotation axis 502 parallel to the Z-axis during the turning of the workpiece using the fixed tool.

First workpiece spindle 111 is fixed to bed 151. Second workpiece spindle 116 is provided to be movable in the Z-axis direction by various teed mechanisms, guide mechanisms, servomotors, and the like. Second workpiece spindle 116 may be configured to be fixed to bed 151. A tailstock supporting the rotation center of the workpiece held by first workpiece spindle 111 may be provided instead of second workpiece spindle 116.

The tool rest (not illustrated) is provided in processing area 110. The tool rest is configured to be able to bold a plurality of fixing tools for workpiece subtractive manufacturing (turning). The tool rest is supported by bed 151 with a saddle or the like (not illustrated) interposed therebetween. The tool rest is provided movable in the X-axis direction and the Z-axis direction by various feed mechanisms, guide mechanisms, servomotors, and the like provided in the saddle or the like. The tool rest may have a milling function for rotating the rotating tool.

Processing machine 100 further includes a first longitudinal frame 152, a second longitudinal frame 153, a first transverse frame 154, and a second transverse frame 311 (see FIG. 3 described later).

First longitudinal frame 152 and second longitudinal frame 153 have a columnar shape in which the X-axis direction (vertical direction) is a longer direction. First longitudinal frame 152 and second longitudinal frame 153 are presided apart from each other in the Z-axis direction. Lower ends of first longitudinal frame 152 and second longitudinal frame 153 are connected to bed 151.

First transverse frame 154 and second transverse frame 311 have a beam shape in which the Z-axis direction (left-right direction) is the longer direction. First transverse frame 154 and second transverse frame 311 are made of a pipe member having a rectangular closed section.

First transverse frame 154 and second transverse frame 311 are provided apart from each other in the Y-axis direction. First transverse frame 154 is provided at a position shifted in the +Y-axis direction from second transverse frame 311. Both ends of first transverse frame 154 in the Z-axis direction are connected to upper ends of first longitudinal frame 152 and second longitudinal frame 153, respectively. Both ends of second transverse frame 311 in the Z-axis direction are connected to upper ends of first longitudinal frame 152 and second longitudinal frame 153, respectively.

First longitudinal frame 152, second longitudinal frame 153, first transverse frame 154, and second transverse frame 311 form a gate-shaped frame structure on bed 151.

Processing machine 100 further includes a saddle 161, a cross slide 162, and a ram 163.

Saddle 161 is supported by bed 151. Saddle 161 is provided on bed 151 and between first longitudinal frame 152 and second longitudinal frame 153 in the Z-axis direction. Saddle 161 has a shape rising upward from bed 151 toward first transverse frame 154 and second transverse frame 311. Saddle 161 is provided to be movable in the Z-axis direction by various feed mechanisms, guide mechanisms, servomotors, and the like provided on bed 151 and the like.

Cross slide 162 is supported by saddle 161. Cross slide 162 has a flat plate shape parallel to the X-axis-Z-axis plane as a whole. Cross slide 162 is attached to a from surface of saddle 161 facing the +Y-axis direction. Cross slide 162 is provided to be movable in the X-axis direction (vertical direction) by various feed mechanisms, guide mechanisms, servomotors, and the like provided on saddle 161 and the like.

Ram 163 is supported by cross slide 162. Ram 163 has a cylindrical shape extending along the Y-axis direction as a whole. Ram 163 is provided so as to penetrate cross slide 162 and to protrude into processing area 110 in the Y-axis direction. Ram 163 is provided movably in the Y-axis direction by various feed mechanisms, guide mechanisms, servomotors, and the like provided on cross slide 162 and the like.

Processing machine 100 further includes a tool spindle 121. Tool spindle 121 is provided in processing area 110. Tool spindle 121 is configured to be able to hold the rotating tool for workpiece subtractive manufacturing (milling). Tool spindle 121 is provided with a clamp mechanism (not illustrated) detachably holding the rotating tool. Tool spindle 121 rotates the held rotating tool about a rotation axis 503 parallel to the X-axis-Z-axis plane during the milling of the workpiece using the rotating tool.

Tool spindle 121 is supported by ram 163. Tool spindle 121 is connected to a tip of rant 163 in the +Y-axis direction. Tool spindle 121 is three-dimensionally movable in processing area 110 by the movement of saddle 161 in the Z-axis direction, the movement of cross slide 162 in the X-axis direction, and the movement of ram 163 in the Y-axis direction.

Tool spindle 121 is further provided so as to be turnable about a aiming axis 504 parallel to the Y-axis (B-axis turning). A turning range of tool spindle 121 is preferably within a range greater than or equal to with respect to a reference posture (posture in FIGS. 1 and 2) in which a spindle end face 122 of tool spindle 121 faces downward. As an example, the turning range of tool spindle 121 is a range of ±120° with respect to the reference posture.

Processing machine 100 further includes an automatic tool changer (ATC) 141 and a tool magazine 171.

Tool magazine 171 accommodates a plurality of rotating tools T used for milling the workpiece. Tool magazine 171 is provided outside processing area 110. Tool magazine 171 is provided on the opposite side of processing area 110 across first workpiece spindle 111 (first longitudinal frame 152). First workpiece spindle 111 (first longitudinal frame 152) is disposed between tool magazine 171 and processing area 110 in the Z-axis direction.

Automatic tool changer 141 is configured to be able to exchange tools between tool spindle 121 in processing area 110 and tool magazine 171 outside processing area 110.

Automatic tool changer 141 is supported by first transverse frame 154. Automatic tool changer 141 is movable in the Z-axis direction by various feed mechanisms, guide mechanisms, servomotors, and the like provided on first transverse frame 154 and the like.

More specifically, a rack 156 and a rail 155 are provided in first transverse frame 154. Rack 156 and rail 155 extend in the Z-axis direction. The range in which rack 156 and rail 155 extend in the Z-axis direction includes the range of processing area 110 in the Z-axis direction. A pinion (not illustrated) that engages with rack 156 is provided in automatic tool changer 141. A slider (not illustrated) slidable in the Z-axis direction while being engaged with rail 155 is provided in automatic tool changer 141.

When the pinion receiving the rotation from the servo motor rotates in the forward direction or the reverse direction, automatic tool changer 141 moves in the +Z-axis direction or the −Z-axis direction. Automatic tool changer 141 is movable between the inside and the outside of processing area 110.

Automatic tool changer 141 is movable between a standby position (position of automatic tool changer 141 in FIG. 1) that is located outside processing area 110 and above first workpiece spindle 111 and at which automatic tool changer 141 waits, an internal-side tool changing position that is located inside processing area 110 and at an arbitrary coordinate in the Z-axis direction and at which automatic tool changer 141 performs tool change with tool spindle 121, and a magazine-side tool changing position that is located outside processing area 110 and on an opposite side of the internal-side tool changing position with the standby position interposed therebetween and at which automatic tool changer 141 performs tool replacement with tool magazine 171.

Automatic tool changer 141 includes a lifting arm 143 and a double arm 144. Lifting arm 143 extends in an arm shape such that the X-axis direction (vertical direction) is the longer direction. Lifting arm 143 can lift and lower in the X-axis direction.

Double arm 144 extends in an arm shape, and includes gripping portions capable of gripping tools at both ends thereof. The double arm 144 is turnable about a turning axis 505 parallel to the Z-axis and is slidable in the axial direction of turning axis 505. Automatic tool changer 141 performs tool replacement by lifting and lowering lifting arm 143 and turning and sliding double arm 144 at each of the internal-side tool changing position and the magazine-side tool changing position.

Processing machine 100 further includes additive-manufacturing head 131. Additive-manufacturing head 131 performs additive manufacturing (directed energy deposition) by ejecting the material powder and irradiating the workpiece with laser beam. Metal powder such as stainless steel, Stellite, Inconel, or titanium can be used as the material powder. The material powder is not limited to the metal powder.

Additive-manufacturing head 131 includes a head body 132 and a laser tool 133. The laser beam and the material powder are introduced into head body 132. Laser tool 133 emits the laser beam toward the workpiece and determines an irradiation region of the laser beam on the workpiece. The material powder introduced into additive-manufacturing head 131 is discharged toward the workpiece through a nozzle (not illustrated).

Processing machine 100 includes a plurality of laser tools 133. The plurality of laser tools 133 are different in the shape and/or a size of the irradiation region of the laser beam defined on the workpiece. Any one of the plurality of laser tools 133 is selectively mounted on head body 132 in accordance with a condition of the additive manufacturing to be executed.

Additive-manufacturing head 131 further includes a disk portion 136. Disk portion 136 has a disk shape in which a thickness direction is the Y-axis direction. Disk portion 136 is connected to head body 132. Disk portion 136 is provided at a position bent at a right angle from the front end portion of head body 132 in the +Y-axis direction. Tool spindle 121 includes a front surface portion 124 and a side surface portion 123. Front surface portion 124 faces the +Y-axis direction. Side surface portion 123 faces the +Z-axis direction in the reference posture of tool spindle 121.

Additive-manufacturing head 131 is detachably attached to tool spindle 121. Additive-manufacturing head 131 is mounted on tool spindle 121 such that head body 132 is opposite to side surface portion 123 and such that disk portion 136 is opposite to front surface portion 124.

Additive-manufacturing head 131 (disk portion 136) and the tool spindle (front surface portion 124) have a built-in clamp mechanism using spring force or the like. When additive-manufacturing head 131 is mounted on tool spindle 121, the clamp mechanism operates to connect additive-manufacturing head 131 to tool spindle 121. Additive-manufacturing head 131 is connected to tool spindle 121 to be integrally movable with tool spindle 121 in the X-axis direction, the Y-axis direction, and the Z-axis direction.

Figure 3:
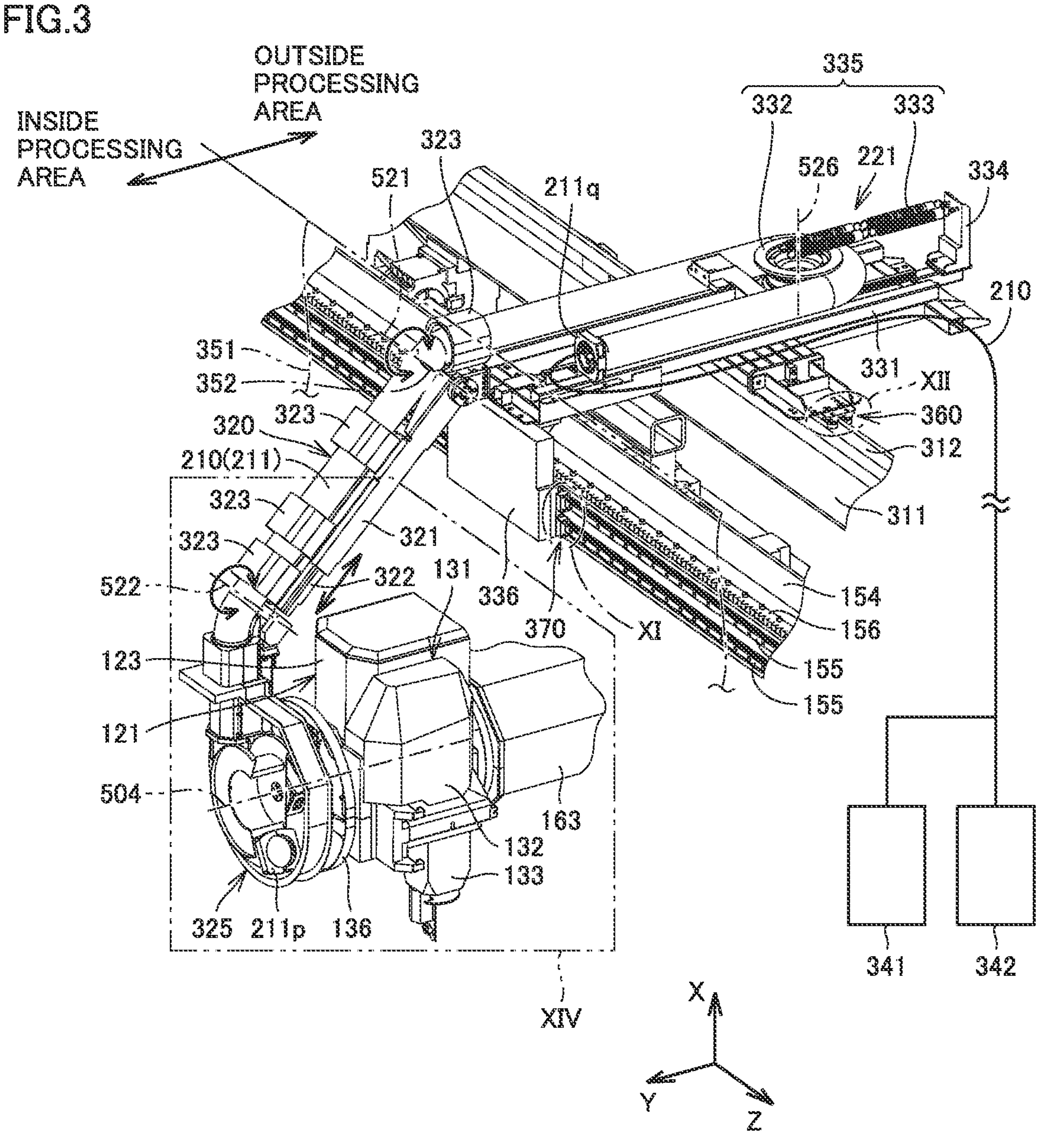
FIG. 3 is a perspective view illustrating a structure supplying a laser beam and a material powder to the additive-manufacturing head in FIG. 1.
Figure 4:
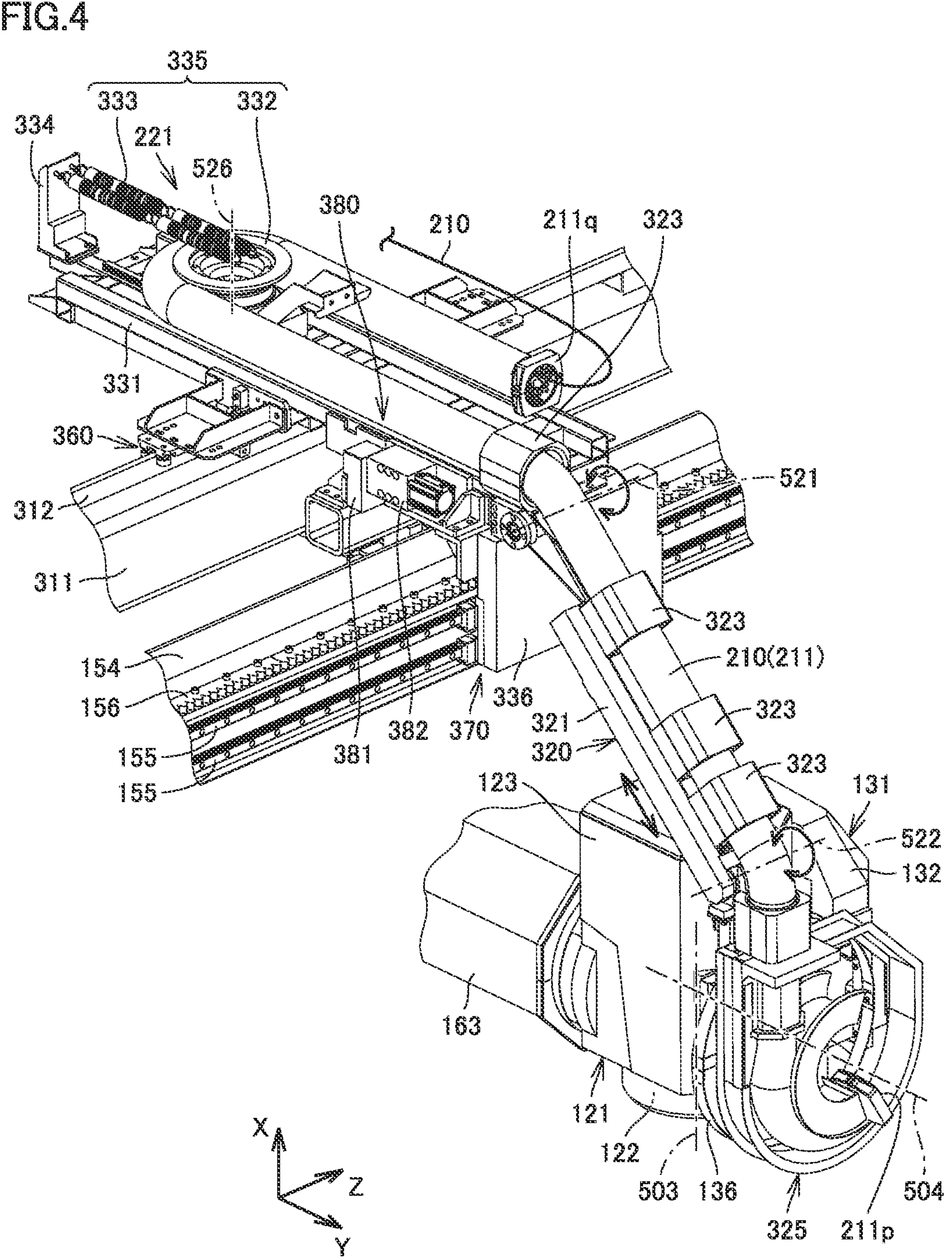
FIG. 4 is another perspective view illustrating the structure supplying the laser beam and the material powder to the additive-manufacturing head in FIG. 1.
Figure 5:
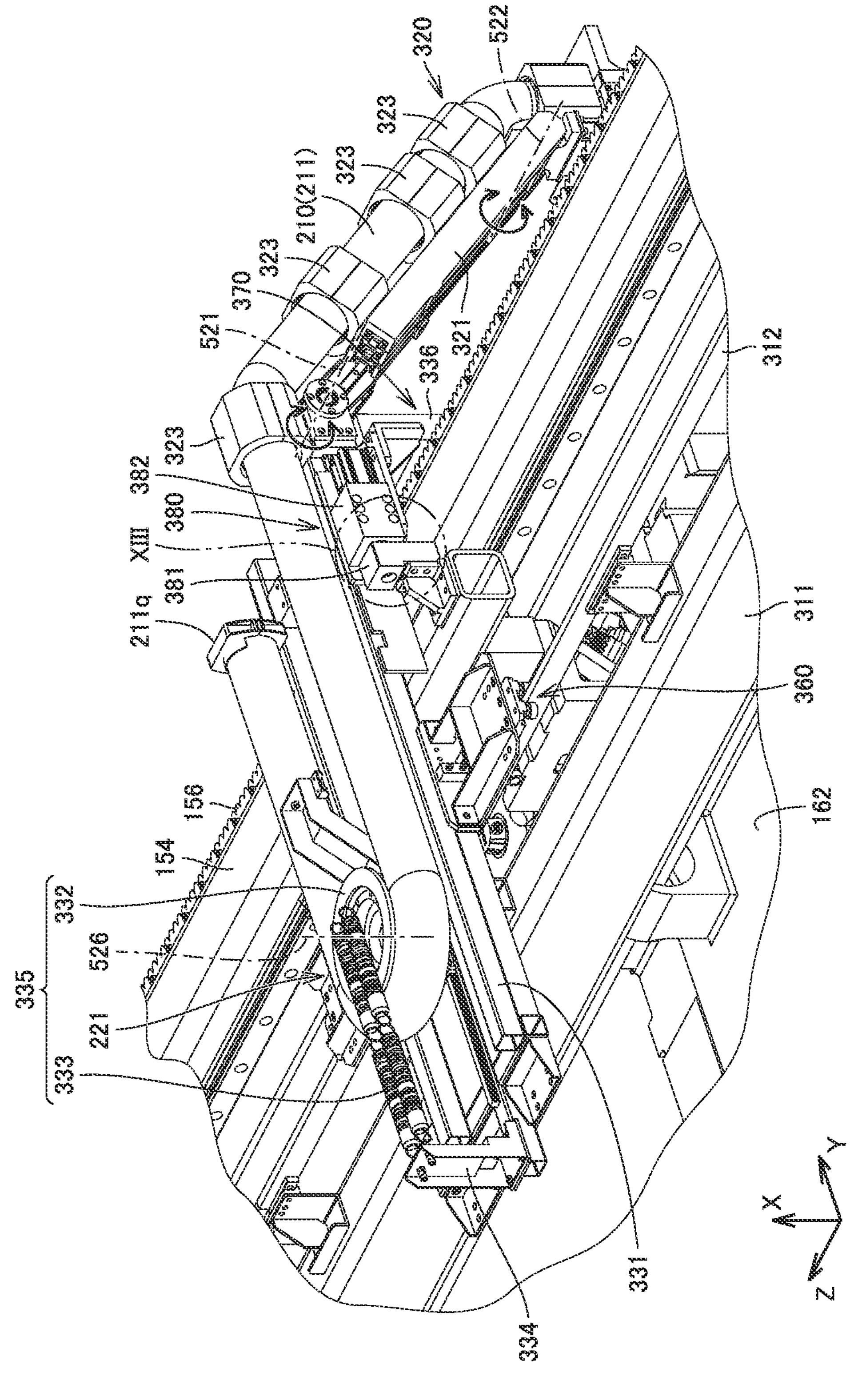
FIG. 5 is still another perspective view illustrating the structure supplying the laser beam and the material powder to the additive-manufacturing head in FIG. 1.

FIGS. 3 to 5 are perspective views illustrating a structure supplying the laser beam and the material powder to additive-manufacturing head in FIG. 1.

Referring to FIGS. 1 to 5, processing machine 100 further includes a material powder supply device 341, a laser oscillation device 342, and a line body 210.

Material powder supply device 341 and laser oscillation device 342 are installed outside processing area 110. Material powder supply device 341 feeds the material powder used for the additive manufacturing toward additive-manufacturing head 131. Laser oscillation device 342 oscillates the laser beam used for the additive manufacturing.

Line body 210 supplies the material powder from material powder supply device 341 to additive-manufacturing head 131, and supplies the laser beam from laser oscillation device 342 to additive-manufacturing head 131. Line body 210 extends from additive-manufacturing head 131. Line body 210 is drawn from the inside to the outside of processing area 110, and connected to material powder supply device 341 and laser oscillation device 342.

Line body 210 has flexibility, and can be bent and deformed when receiving external force. Line body 210 includes an optical fiber guiding the laser beam, a pipe guiding the material powder, an air pipe serving as a flow path of air, a gas pipe. Serving as a flow path of an inert gas, a cooling pipe serving as a flow path of a refrigerant, electric wiring, and a flexible tube 211 accommodating these.

Processing machine 100 further includes a support 221. Support 221 supports line body 210 drawn from processing area 110 outside processing area 110. Support 221 is provided above additive-manufacturing head 131. Support 221 is supported by first transverse frame 154 and second transverse frame 311.

Support 221 is guided along the Z-axis direction by various guide mechanisms provided in first transverse frame 154 and the like. Support 221 is detachably attached to saddle 161. Support 221 is connected to saddle 161 to move integrally with saddle 161 in the Z-axis direction.

Furthermore, support 221 is independently movable in the Z-axis direction by various feed mechanisms, servomotors, fend the like provided in first transverse frame 154 and the like (self-traveling mechanism). A pinion (not illustrated) that engages with a rack 156 provided on first, transverse frame 154 is provided in support 221. The pinion that receives the rotation from the servo motor rotates in the forward direction or the reverse direction while the connection of support 221 to saddle 161 is released, so that support 221 moves in the +Z-axis direction or the −Z-axis direction.

In such the configuration, automatic tool changer 141 and support 221 share the guide mechanism (rail 155) and the feed mechanism (rack 156) that enable the movement in the Z-axis direction.

The structure supplying the laser beam and the material powder to additive-manufacturing head 131 will be described in detail later.

Figure 6:
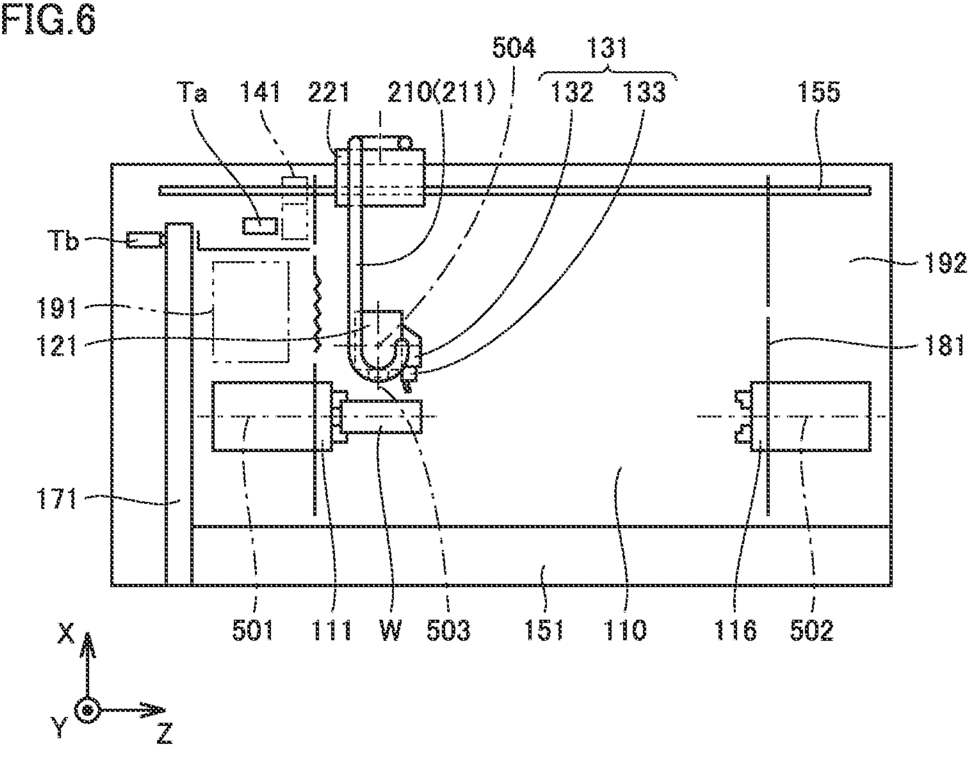
FIG. 6 is a front view schematically illustrating a process of a processing flow of a workpiece in the processing machine in FIG. 1.
Figure 7:
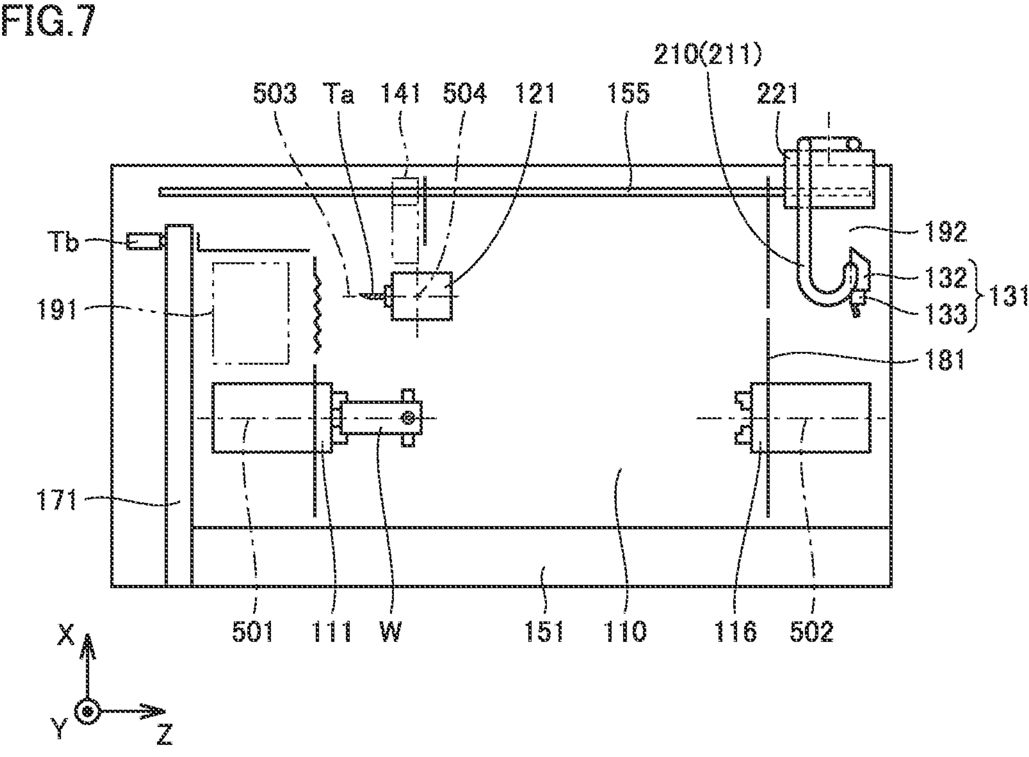
FIG. 7 is a front view schematically illustrating a next process of the processing flow of the workpiece in the processing machine in FIG. 1.
Figure 8:
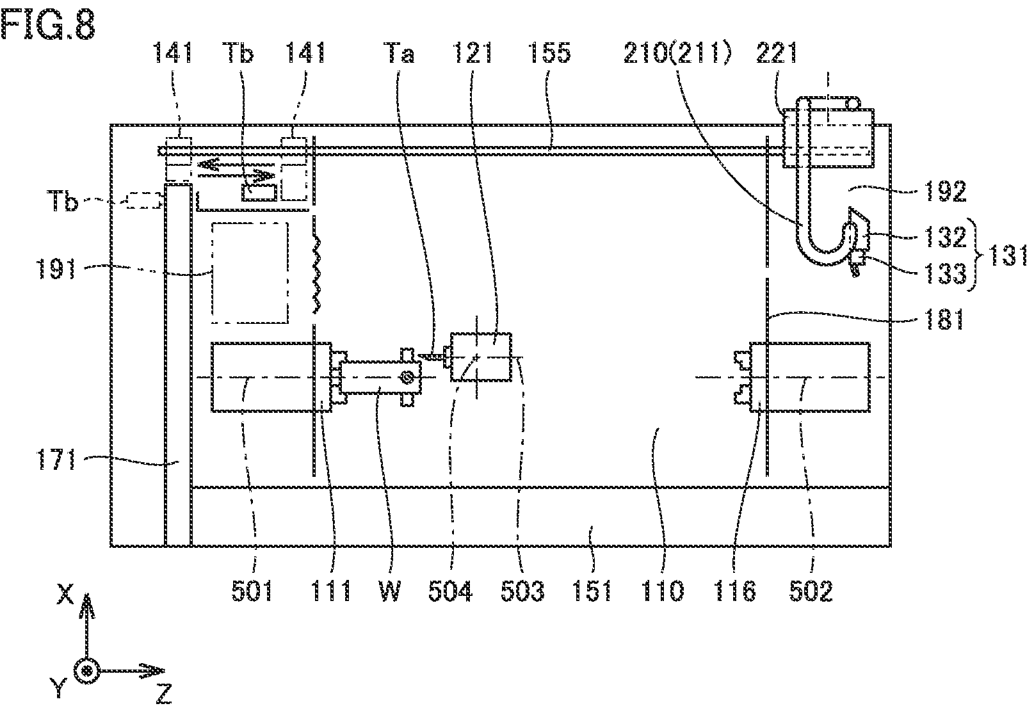
FIG. 8 is a front view schematically illustrating a further next process of the processing flow of the workpiece in the processing machine in FIG. 1.

FIGS. 6 to 8 are from views schematically illustrating a processing flow of the workpiece in the processing machine in FIG. 1.

Referring to FIGS. 6 to 8, processing machine 100 further includes a laser tool storage portion 191 and a head storage portion 192. Laser tool storage portion 191 is configured to be able to store a plurality of laser tools 133. Head storage portion 192 is configured to be able to store additive-manufacturing head 131 separated from tool spindle 121 during subtractive manufacturing for the workpiece.

Laser tool storage portion 191 and head storage portion 192 are provided outside processing area 110. Laser tool storage portion 191 is provided between first workpiece spindle 111 and the standby position of automatic tool changer 141 in the X-axis direction (vertical direction). Head storage portion 192 is provided above second workpiece spindle 116.

As illustrated in FIG. 6, during the additive manufacturing for a workpiece W, additive-manufacturing head 131 is mounted on tool spindle 121. When tool spindle 121 moves in the X-axis direction, the Y-axis direction, and the Z-axis direction, additive-manufacturing head 131 also moves in processing area 110 integrally with tool spindle 121. Thus, the processing position of the additive manufacturing by additive-manufacturing head 131 is three-dimensionally displaced. Furthermore, when tool spindle 121 turns about turning axis 504, additive-manufacturing head 131 also turns about turning axis 504 integrally with tool spindle 121. Thus, the direction of the additive manufacturing by additive-manufacturing head 131 (the irradiation direction of the laser beam with respect to the workpiece) can be freely changed.

When additive-manufacturing head 131 is moved to the position opposite to laser tool storage portion 191 in the Z-axis direction, laser tool 133 mounted on additive-manufacturing head 131 can be replaced with another laser tool 133 stored in the laser tool storage portion 101.

As illustrated in FIG. 7, when the subtractive manufacturing for workpiece W is performed subsequent to the additive manufacturing for workpiece W, the connection between tool spindle 121 and additive-manufacturing head 131 is released, and the connection between support 221 and saddle 161 is also released. Additive-manufacturing head 131 integrated with support 221 is moved from the inside of processing area 110 to head storage portion 192 outside processing area 110 by the self-traveling mechanism provided in support 221.

On the other hand, tool spindle 121 from which additive-manufacturing head 131 is separated is turned by 90° about turning axis 504 from the reference posture Automatic tool changer 141 is moved from the standby position to the internal-side tool changing position in processing area 110. A tool Ta gripped by double arm 144 in automatic tool changer 141 is mounted on tool spindle 121 by automatic tool changer 141. When automatic tool changer 141 is moved from the internal-side tool changing position to the standby position, the mounting of the tool to tool spindle 121 is completed.

The internal-side tool changing position is appropriately set such that a movement amount of tool spindle 121 from the position of tool spindle 121 to the internal-side tool changing position at the start of tool change is shortened. The internal-side tool changing position set in this way may be selected from any coordinate in the Z-axis direction, or selected from a plurality of coordinate candidates in the Z-axis direction.

As illustrated in FIG. 8, during the subtractive manufacturing for workpiece W, the workpiece is milled by tool Ta held by tool spindle 121 while additive-manufacturing head 131 is stored in head storage portion 192.

During this time, automatic tool changer 141 is moved from the standby position to the magazine-side tool changing position, and tool Tb stored in tool magazine 171 at the magazine-side tool changing position is moved to automatic tool changer 141. Automatic tool changer 141 holding tool Tb is moved from the magazine-side tool changing position to the standby position to prepare for the next tool change in tool spindle 121.

The structure supplying the laser beam and the material powder to additive-manufacturing head 131 will be described in more detail below.

Figure 9:
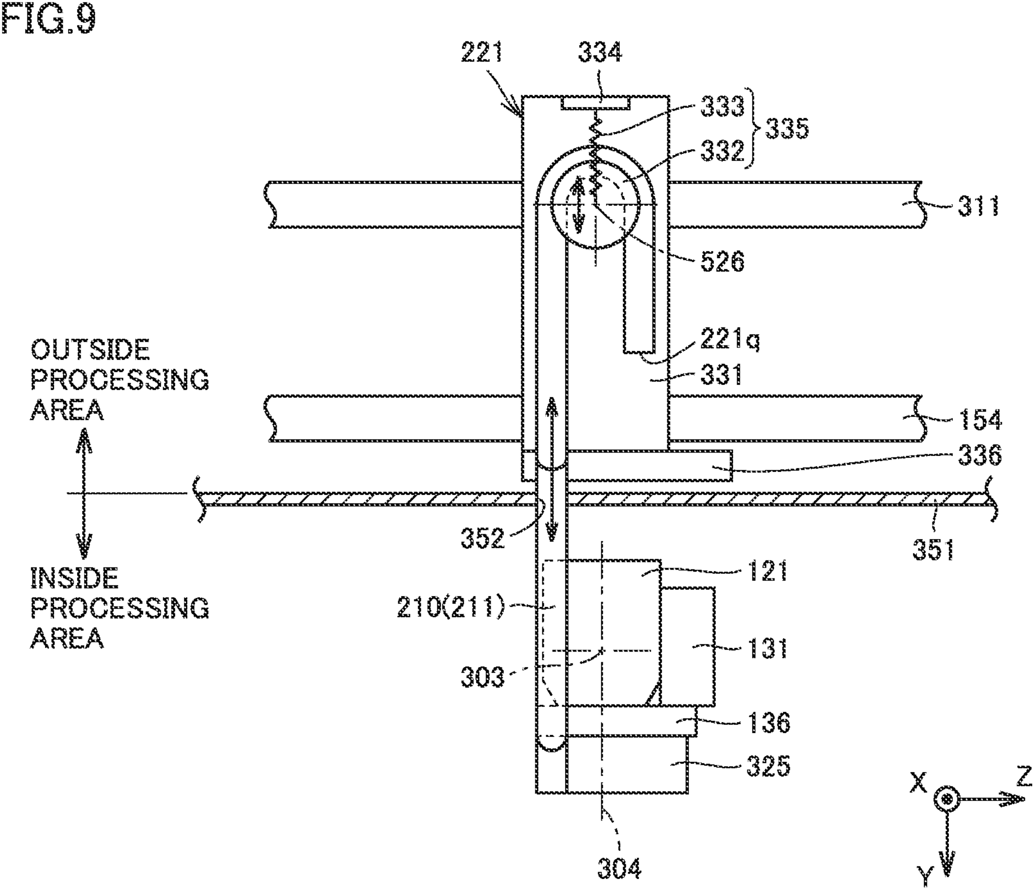
FIG. 9 is a top view partially illustrating the processing machine in FIG. 1.

FIG. 9 is a top view partially illustrating the processing machine in FIG. 1. Referring to FIGS. 3 and 9, splash guard 181 includes a slide cover 351.

As a whole, slide cover 351 has a flat plate shape parallel to the X-axis-Z-axis plane. Slide cover 351 is disposed on the back side of processing area 110 (the end of processing area 110 in the −Y-axis direction). Ram 163 penetrates slide cover 351 front the outside of processing area 110 and enters processing area 110 in the Y-axis direction. Slide cover 351 is slidably deformable in accordance with the movement of ram 163 in the X-axis direction and the Z-axis direction.

A line body insertion hole 352 is made in slide cover 351. Line body insertion hole 352 is a through-hole penetrating slide cover 351 in the Y-axis direction. Line body 210 (flexible tube 211) is inserted into line body insertion hole 352 from the inside of processing area 110 to be drawn out of processing area 110.

The drawing direction of line body 210 (flexible tube 211) from the inside to the outside of processing area 110 is a direction intersecting the Z-axis direction in top view.

The drawing direction of line body 210 (flexible tube 211) front the inside to the outside of processing area 110 is a direction orthogonal to the Z-axis direction in top view. The drawing direction of line body 2101 flexible tube 211) from the inside to the outside of processing area 110 is the −Y-axis direction in top view. Line body 210 (flexible tube 211) is inserted into line body insertion hole 352 while extending in the −Y-axis direction in top view.

Figure 10:
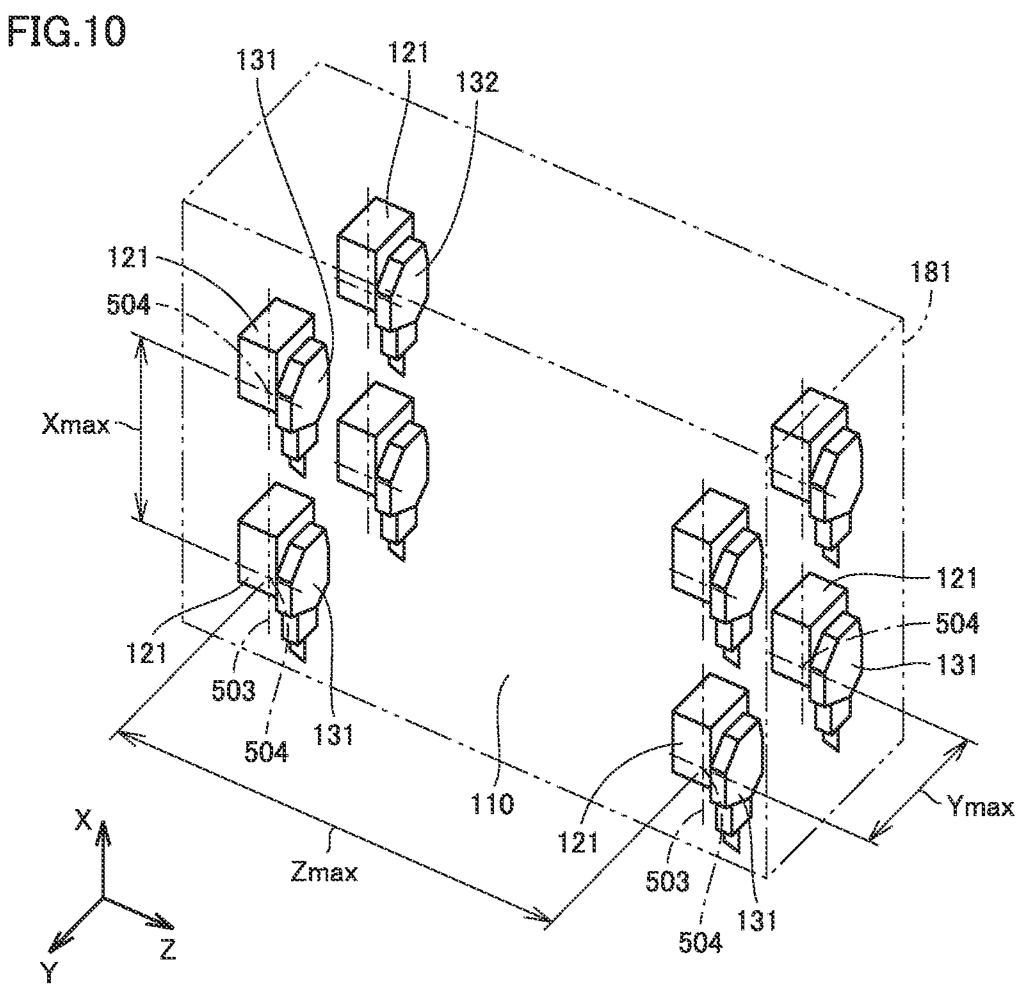
FIG. 10 is a perspective view illustrating a maximum movement amount of the tool spindle in a processing area.

FIG. 10 is a perspective view illustrating a maximum movement amount of the tool spindle in the processing area. Referring to FIG. 10, a maximum movement amount Ymax of tool spindle 121 in the Y-axis direction is smaller than a maximum movement amount Zmax of tool spindle 121 in the Z-axis direction (Ymax<Zmax). A maximum movement amount Xmax of tool spindle 121 in the X-axis direction is shorter than maximum movement amount Zmax of tool spindle 121 in the Z-axis direction (Xmax<Zmax). Maximum movement amount Ymax of tool spindle 121 in the Y-axis direction may be larger than or equal to maximum movement amount Xmax of tool spindle 121 in the X-axis direction, or may be smaller than maximum movement amount Xmax of tool spindle 121 in the X-axis direction.

For example, maximum movement amount Zmax of tool spindle 121 in the Z-axis direction may be greater than or equal to 4000 mm.

In such the configuration, when line body 210 extending front additive-manufacturing head 131 is drawn to the outside of processing area 110 while extending in the +Z-axis direction in top view, the total length of line body 210 extending in processing area 110 becomes considerably long along with the movement of tool spindle 121 and additive-manufacturing head 131 in the −Z-axis direction. In this case, there is a concern that line body 210 in processing area 110 is greatly bent by its own weight. In addition, there is a concern that line body 210 interferes with the workpiece held by second workpiece spindle 116 when line body 210 is greatly bent in processing area 110, or there is a concern that line body 210 interferes with second workpiece spindle 116 itself when second workpiece spindle 116 is configured to be movable in the Z-axis direction.

Referring to FIGS. 9 and 10, in processing machine 100 of the embodiment, the drawing direction of line body 210 from the inside to the outside of processing area 110 is the Y-axis direction (−Y-axis direction) in top view, and maximum movement amount Ymax of tool spindle 121 in the Y-axis direction is shorter than maximum movement amount Zmax of tool spindle 121 in the Z-axis direction. With such the configuration, even when additive-manufacturing head 131 moves in the Y-axis direction together with tool spindle 121, the total length of line body 210 extending in processing area 110 can be prevented to be short. Thus, the interference between line body 210 and second workpiece spindle 116 or the workpiece field by second workpiece spindle 116 can be prevented while the deflection of line body 210 in processing area 110 is prevented.

Referring to FIGS. 3 to 5 and 9, support 221 includes a base 331, a pulley portion 332, and a coil spring (elastic member) 333.

Base 331 is provided on first transverse frame 154 and second transverse frame 311. Base 331 is provided across first transverse frame 154 and second transverse frame 311 in top view. Line body 210 drawn from the inside to the outside of processing area 110 is routed on base 331. Line body 210 routed on base 331 is inserted into cable bear (registered trademark) (not illustrated) that can stroke in the Z-axis direction, and then extends toward material powder supply device 341 and laser oscillation device 342.

Pulley portion 332 is supported by base 331. Pulley portion 332 is provided so as to be rotatable about a rotation axis 526 parallel to the X-axis direction (vertical direction) and to be slidable in the Y-axis direction.

One end of coil spring 333 is connected to pulley portion 332. The other end of coil spring 333 is connected to base 331 with a bracket 334 interposed therebetween. Coil spring 333 applies elastic force in the −Y-axis direction to pulley portion 332. Coil spring 333 applies the elastic force in the direction away from processing area 110 in top view to pulley portion 332.

Flexible tube 211 is made of a flexible tube. Flexible tube 211 extends between the inside and the outside of processing area 110. One end 211*p* of flexible tube 211 is disposed inside processing area 110. The other end 211*q* of flexible tube 211 is disposed outside processing area 110.

Flexible tube 211 drawn from the inside to the outside of processing area 110 through line body insertion hole 352 extends in the −Y-axis direction on base 331. Flexible tube 211 is wound around pulley portion 332, is inverted by 180°, and extends in the +Y-axis direction. The other end 211*q* of flexible tube 211 is fixed to base 331 at the tip of flexible tube 211 extending in the +Y-axis direction.

Pulley portion 332 and coil spring 333 constitute a tension applying mechanism 335. Tension applying mechanism 335 applies tension in the direction away from additive-manufacturing head 131 in processing area 110 to line body 210 (flexible tube 211). Tension applying mechanism 335 applies tensile force from the inside to the outside of processing area 110 to line body 210 (flexible tube 211).

According to such the configuration, the deflection of line body 210 in processing area 110 can be more effectively prevented. When pulley portion 332 slides in the Y-axis direction, the length of line body 210 in processing area 111 can be automatically adjusted in accordance with the position of additive-manufacturing head 131.

The elastic member constituting tension applying mechanism 335 is not particularly limited, and for example, a gas spring may be used instead of coil spring 333.

Figure 11:
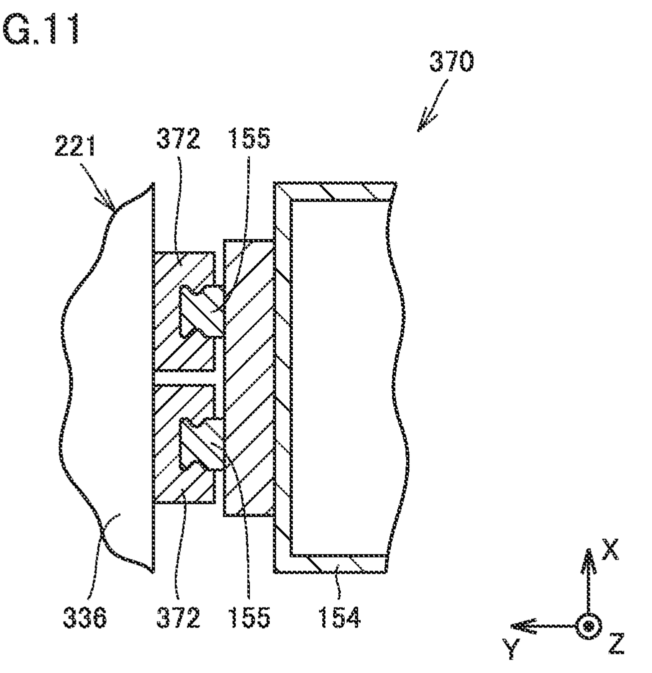
FIG. 11 is a sectional view illustrating a range surrounded by a two-dot chain line XI in FIG. 3.
Figures 12, 13:
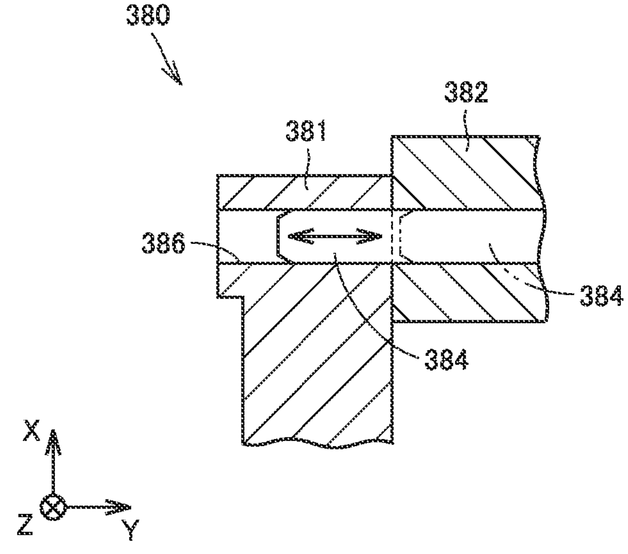
FIG. 12 is a sectional view illustrating a range surrounded by a two-dot chain line XII in FIG. 3.
FIG. 13 is a sectional view illustrating a range surrounded by a two-dot chain line XIII in FIG. 5.

FIG. 11 is a sectional view illustrating a range surrounded by a two-dot chain line XI in FIG. 3. FIG. 12 is a sectional view illustrating a range surrounded by a two-dot chain line XII in FIG. 3.

Referring to FIGS. 3 to 5, 11 and 12, processing machine 100 further includes a first guide mechanism 370 and a second guide mechanism 360. First guide mechanism 370 and second guide mechanism 360 guide support 221 along the Z-axis direction. First guide mechanism 370 and second guide mechanism 360 are provided apart from each other in the Y-axis direction.

As illustrated in FIGS. 3, 4, and 11, support 221 further includes a block 336. Block 336 is fixed to base 331. Block 336 is opposite to first transverse frame 154 in the Y-axis direction.

First guide mechanism 370 includes rail 155 and a slider 372. First guide mechanism 370 includes two sets of rails 155 and sliders 372. Rail 155 is attached to first transverse frame 154. Rail 155 extends in the Z-axis direction. Slider 372 is attached to block 336. Slider 372 is engaged with rail 155 with a plurality of balls (not illustrated) interposed therebetween. Slider 372 and rail 155 constitute a linear guide mechanism in the Z-axis direction.

As illustrated in FIGS. 3 to 5 and 12, second guide mechanism 360 is provided at a position away from first guide mechanism 370 in the −Y-axis direction. Second guide mechanism 360 includes a rail 312 a pair of first rollers 361, 362, and a pair of second rollers 363, 364. Second guide mechanism 360 includes two sets of the pair of first rollers 361, 362 and the pair of second toilers 363, 364.

Rail 312 is attached to second transverse frame 311. Rail 312 extends in the Z-axis direction. The pair of first rollers 361, 362 and the pair of second rollers 363, 364 are supported by base 331.

First roller 361 and first roller 362 are provided so as to be rotatable about a rotation axis 531 and a rotation axis 532 parallel to the X-axis direction, respectively. First roller 361 and first roller 362 sandwich rail 312 from both sides in the Y-axis direction. Second roller 363 and second roller 364 are rotatably supported about a rotation axis 533 and a rotation axis 534 parallel to the Y-axis direction, respectively. Second roller 363 and second roller 364 sandwich rail 312 from both sides in the X-axis direction.

According to such the configuration, support 221 is guided by first guide mechanism 370 and second guide mechanism 360 at positions separated from each other in the Y-axis direction, so that support 221 can be smoothly moved in the Z-axis direction.

FIG. 13 is a sectional view illustrating a range surrounded by a two-dot chain line XIII in FIG. 5. Referring to FIGS. 5 and 13, processing machine 100 further includes a coupling mechanism 380.

Coupling mechanism 380 is operable between a first state of coupling tool spindle 121 and support 221 when additive-manufacturing head 131 is mounted on tool spindle 121 to perform the additive manufacturing for the workpiece and a second state of releasing the coupling between tool spindle 121 and support 221 when additive-manufacturing head 131 is removed from tool spindle 121 and the subtractive manufacturing for the workpiece is performed.

Coupling mechanism 380 includes an air cylinder 382 and a block 381. Block 381 is attached to saddle 161. A pin insertion hole 386 is made in block 381. Pin insertion hole 386 extends in the Y-axis direction and opens toward the +Y-axis direction.

Air cylinder 382 is attached to support 221. Air cylinder 382 includes a pin 384. Pin 384 is movable forward and backward in the Y-axis direction by driving air cylinder 382. When pin 384 is inserted into pin insertion hole 386, the first state in which tool spindle 121 and support 221 are coupled to each other is obtained. When pin 384 is pulled out of pin insertion hole 386, the second state in which the coupling between tool spindle 121 and support 221 is released is obtained.

According to such the configuration, during the additive manufacturing for the workpiece, tool spindle 121 and support 221 are coupled by coupling mechanism 380, so that support 221 is moved in the Z-axis direction integrally with tool spindle 121 and additive-manufacturing head 131. Accordingly, the structure moving support 221 in the Z-axis direction in synchronization with tool spindle 121 and additive-manufacturing head 131 can be implemented by a simple configuration. Furthermore, when the coupling between tool spindle 121 and support 221 is released by coupling mechanism 380 during the subtractive manufacturing for the workpiece, the subtractive manufacturing for the workpiece can be performed by tool spindle 121 separated from support 221 and additive-manufacturing head 131.

Referring to FIGS. 3 and 4, processing machine 100 further includes a first guide member 320. First guide member 320 guides line body 210 (flexible tube 211) between additive-manufacturing head 131 and support 221. First guide member 320 is connected to additive-manufacturing head 131 so as to be able to revolve about a first revolving axis 522 parallel to the Z-axis. First guide member 320 is connected to support 221 so as to be able to revolve about a second revolving axis 521 parallel to the Z-axis.

First guide member 320 extends obliquely downward (+Y-axis direction and −X-axis direction) from support 221 toward a second guide member 325 described later. First guide member 320 is connected to second guide member 325 in first revolving axis 522, and connected to base 331 in the second revolving axis 521. When first guide member 320 revolves about first revolving axis 522 and second revolving axis 521, an inclination of first guide member 320 changes.

The first guide member 320 includes a linear guide portion 321 and a plurality of cover bodies 323.

Linear guide portion 321 extends linearly between first revolving axis 522 and second revolving axis 521. Linear guide portion 321 is provided so as to support line body 210 (flexible tube 211) fed from support 221 toward second guide member 325 from below. Linear guide portion 321 is provided as an expansion and contraction mechanism that expands and contracts such that the distance between first revolving axis 522 and second revolving axis 521 changes. Linear guide portion 321 has a multistage structure of a plurality of linear guides combined so as to be extendable, in a direction from first revolving axis 522 toward second revolving axis 521.

The plurality of cover bodies 323 are attached to linear guide portion 321. The plurality of cover bodies 323 are arranged at intervals in the direction from first revolving axis 522 toward second revolving axis 521. Cover body 323 is provided so as to cover flexible tube 211 supported by linear guide portion 321 from the outer periphery thereof. Flexible rube 211 is supported by first guide member 320 so as to be slidable along a guiding direction (a direction connecting first revolving axis 522 and second revolving axis 521) by first guide member 320.

According to such the configuration, when additive-manufacturing head 131 moves in the Y-axis-X-axis plane, first guide member 320 revolves about first revolving axis 522 and second revolving axis 521, and linear guide portion 321 extends and contracts. As a result, a routing path of line body 210 (flexible tube 211) between second guide member 325 and support 221 smoothly changes in accordance with the movement of additive-manufacturing head 131, so that line body 210 (flexible tube 211) can be smoothly drawn without applying an excessive load.

Figure 14:
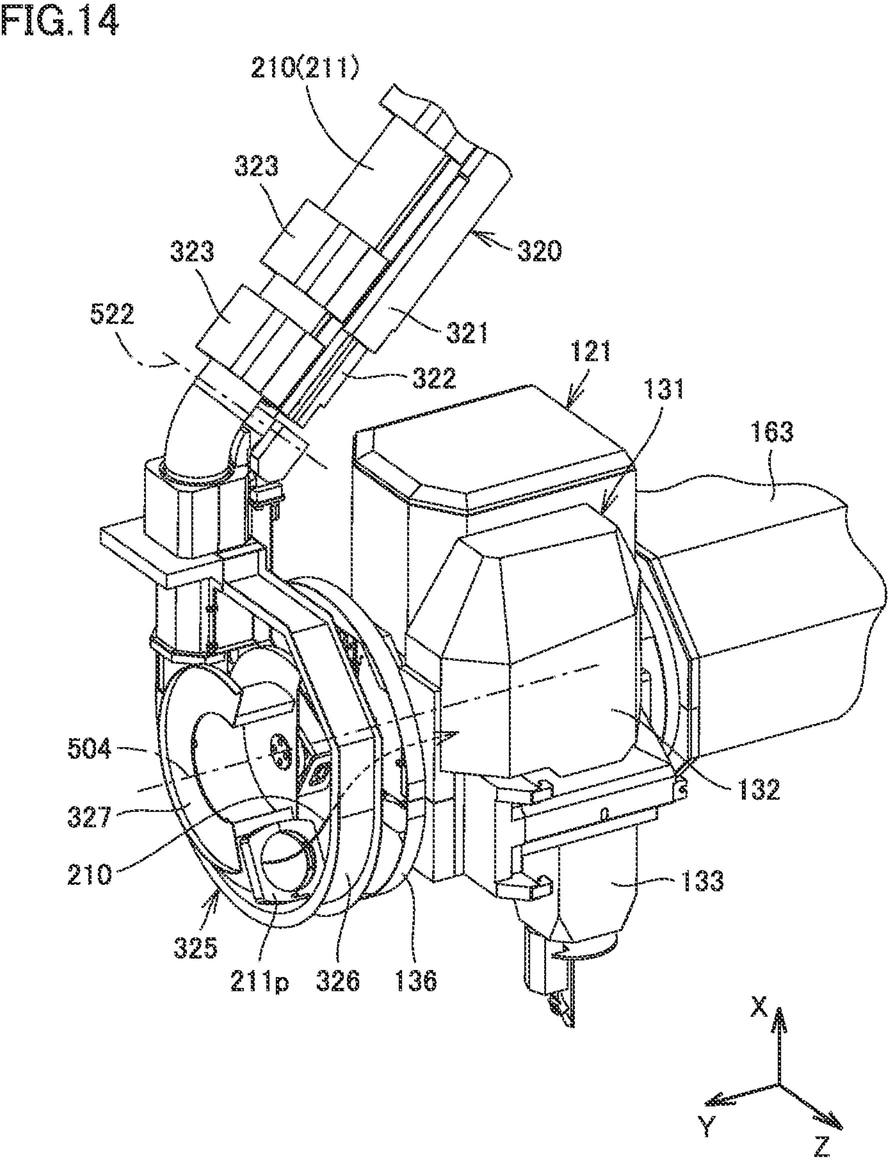
FIG. 14 is a perspective view illustrating a range surrounded by a two-dot chain line XIV in FIG. 3.
Figure 15:
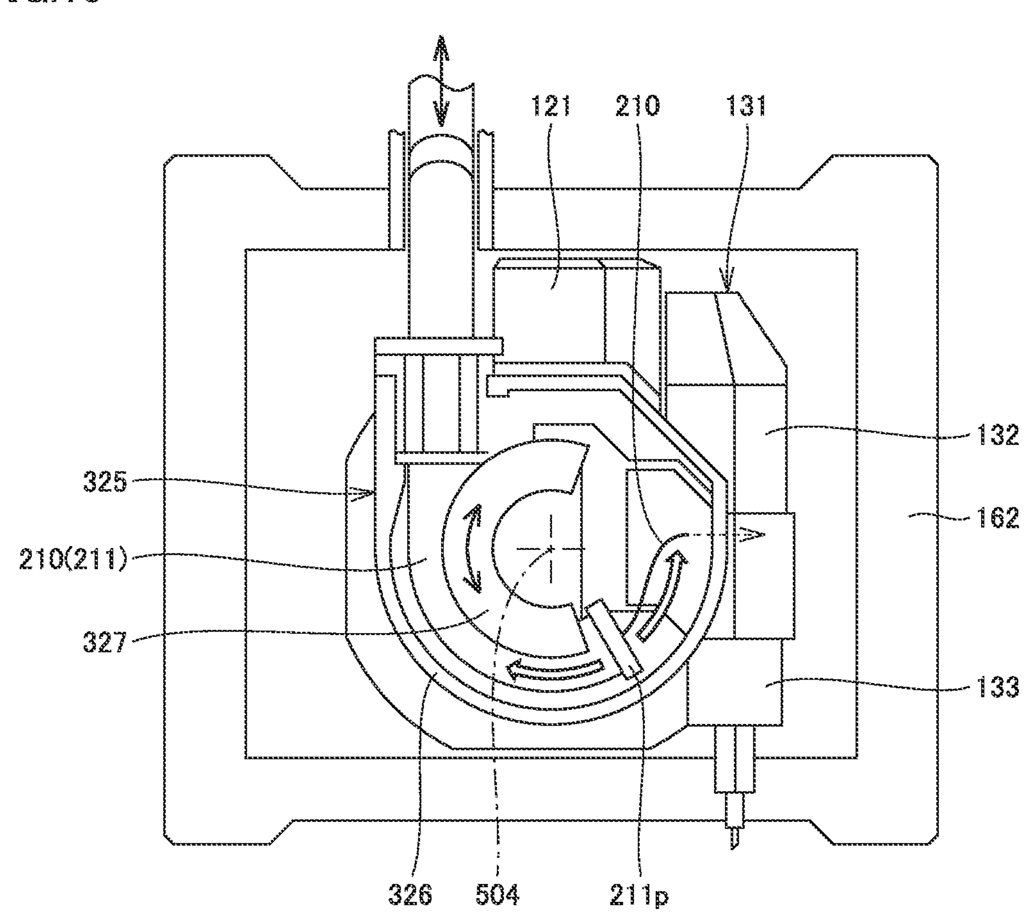
FIG. 15 is a front view illustrating the processing machine in FIG. 14.

FIG. 14 is a perspective view illustrating a range surrounded by a two-dot chain line XIV in FIG. 3. FIG. 15 is a front view illustrating the processing machine in FIG. 14.

Referring to FIGS. 14 and 15, processing machine 100 further includes second guide member 325. Second guide member 325 is provided between additive-manufacturing head 131 and first guide member 320 on the path on which line body 210 is routed. Second guide member 325 guides line body 210 extending from additive-manufacturing head 131 along the circumferential direction of turning axis 504.

Second guide member 325 revolves relative to tool spindle 121 about turning axis 504 so as to maintain the posture of second guide member 325 in the circumferential direction of turning axis 304 when tool spindle 121 turns.

Disk portion 136 is disposed between second guide member 325 and tool spindle 121 in the Y-axis direction (the axial direction of turning axis 504). Second guide member 325 is supported by disk portion 136 in additive-manufacturing head 131. Second guide member 325 is relatively resolvable about turning axis 504 with respect to disk portion 136.

Second guide member 325 has an outer peripheral wall 326. Outer peripheral wall 326 forms a wall shape extending along the circumferential direction of turning axis 504.

An inner peripheral wall 327 is connected to disk portion 136. Inner peripheral wall 327 forms a wall shape protruding in the +Y-axis direction from disk portion 136 and extending along the circumferential direction of turning axis 504. Inner peripheral wall 327 is disposed on the inner peripheral side of outer peripheral wall 326. A space extending in the circumferential direction of turning axis 504 is provided between inner peripheral w all 327 and outer peripheral wall 326, and line body 210 (flexible tube 211) is disposed in the space.

When tool spindle 121 turns, inner peripheral wall 327 turns about turning axis 504 together with disk portion 136 integrated with tool spindle 121. On the other hand, because first guide member 320 is connected to second guide member 325, second guide member 325 revolves relative to tool spindle 121 (disk portion 136) about turning axis 504 so as to maintain the posture of second guide member 325 in the circumferential direction of turning axis 504.

At this point, line body 210 (flexible tube 211) slides in the circumferential direction of turning axis 504 in the space between inner peripheral wall 327 and outer peripheral wall 326, whereby the relative positional relationship between one end 211*p* of flexible tube 211 and head body 132 is maintained. Thus, the routing path of line body 210 around turning axis 504 is maintained, so that the application of the excessive load to line body 210 accompanying the B-axis turning of tool spindle 121 can be prevented.

When the structure of processing machine 100 of the embodiment of the present invention described above is summarized, processing machine 100 of the embodiment is the processing machine capable of performing the additive manufacturing and subtractive manufacturing for the workpiece. Processing machine 100 includes splash guard 181 that defines and forms processing area 110, tool spindle 121 that holds the rotating tool for the subtractive manufacturing for the workpiece and is movable inside processing area 110 in the axial direction of the Z-axis as the first axis parallel to the horizontal direction and the axial direction of the Y-axis as the second axis parallel to the horizontal direction and orthogonal to the Z-axis, additive-manufacturing head 131 that is connected to tool spindle 121 and discharges the material powder to the workpiece and emits the laser beam, and line body 210 that extends from additive-manufacturing head 131, is drawn front the inside of processing area 110 to the outside, and supplies the material powder and the laser beam to additive-manufacturing head 131. The maximum movement amount of tool spindle 121 in the axial direction of the Y-axis is shorter than the maximum movement amount of tool spindle 121 in the axial direct) on of the Z-axis. The drawing direction of line body 210 from the inside to the outside of processing area 110 is a direction intersecting the axial direction of the Z-axis in top view.

According to processing machine 100 of the embodiment of the present invention configured as described above, the generation of deflection in line body 210 supplying the material powder and the laser beam to additive-manufacturing head 131 can be prevented in processing area 110.

In the embodiment, the case where the AM/SM hybrid processing machine is configured based on the combined processing machine having the turning function and the milling function has been described. However, the present invention is not limited to such the configuration, and for example, the AM/SM hybrid processing machine may be configured based on a machining center having the milling function.

It should be considered that the disclosed embodiment is an example in all respects and not restrictive. The scope of the present invention is defined by not the description above, but the claims, and it is intended that all modifications within the meaning and scope of the claims and their equivalents are included in the present invention.

INDUSTRIAL APPLICABILITY

The present invention is mainly applied to an AM/SM hybrid processing machine capable of performing the additive manufacturing and subtractive manufacturing for the workpiece.

REFERENCE SIGNS LIST

100: processing machine, 110: processing area, 111 first workpiece spindle, 116: second workpiece spindle, 121: tool spindle, 122: spindle end face, 123: side surface portion, 124: front surface portion, 131: additive-manufacturing head, 132: head body, 133: laser tool, 136: disk portion, 141: automatic tool changer, 143: lifting arm, 144: double arm, 151: bed, 152: first longitudinal frame, 153: second longitudinal frame, 154: first transverse frame, 155, 312: rail, 156: rack, 161: saddle, 162: cross slide, 163: ram, 171: tool magazine, 181: splash guard, 101: laser tool storage portion, 192: head storage portion, 210: line body, 211: flexible tube, 211*p*: one end, 211*q*: the other end, 221: support, 311: second transverse frame, 320: first guide member, 321: linear guide, 323: cover body, 325: second guide member, 326: outer peripheral wall, 327: inner peripheral wall, 331: base, 332: pulley portion, 333: coil spring, 334: bracket, 335: tension applying mechanism, 336, 381: block; 341: material powder supply device, 342: laser oscillation device, 351: slide cover, 352: line body insertion hole, 360: second guide mechanism, 361, 362: first roller, 363, 364: second roller, 370: first guide mechanism, 372: slider, 380: coupling mechanism, 382: air cylinder, 386: pin insertion hole, 501, 502, 503, 526, 531, 532, 533, 534: rotation axis, 504, 505: turning axis, 521: second revolving axis, 522: first revolving axis.

The invention claimed is:

1. A processing machine capable of performing additive manufacturing and subtractive manufacturing for a workpiece, the processing machine comprising:

a splash guard that defines and forms a processing area;

a tool spindle that holds a rotating tool for the subtractive manufacturing for the workpiece and is movable inside the processing area in an axial direction of a first axis parallel to a horizontal plane and an axial direction of a second axis parallel to the horizontal plane and orthogonal to the first axis;

an additive-manufacturing head that is connected to the tool spindle, discharges material powder to the workpiece, and irradiates the workpiece with a laser beam;

a workpiece spindle that holds the workpiece and rotates the workpiece about a rotation axis parallel to the first axis; and a line body that extends from the additive-manufacturing head, is drawn from an inside to an outside of the processing area, and supplies the material powder and the laser beam to the additive-manufacturing head, the line body including an optical fiber guiding the laser beam and including a gas pipe serving as a flow path of inert gas, wherein a maximum movement amount of the tool spindle in the axial direction of the second axis is shorter than a maximum movement amount of the tool spindle in the axial direction of the first axis, and a drawing direction of the line body from the inside to the outside of the processing area is a direction intersecting the axial direction of the first axis in top view.

2. The processing machine according to claim 1, wherein the drawing direction of the line body from the inside to the outside of the processing area is a direction orthogonal to the axial direction of the first axis in top view.

3. The processing machine according to claim 1, further comprising a support that supports the line body outside the processing area and is movable in the axial direction of the first axis.

4. The processing machine according to claim 3, further comprising a first guide mechanism and a second guide mechanism that are provided apart from each other in the axial direction of the second axis and guide the support along the axial direction of the first axis, the first guide mechanism including a first rail and a slider, the second guide mechanism including a second rail and a roller.

5. The processing machine according to claim 3, wherein the additive-manufacturing head is detachably provided with respect to the tool spindle, and the processing machine further comprises a coupling that is operable between a first state in which the tool spindle and the support are coupled to each other by the coupling when the additive-manufacturing head is mounted on the tool spindle and the additive manufacturing for the workpiece is performed, and a second state in which the coupling between the tool spindle and the support is released when the additive-manufacturing head is removed from the tool spindle and the subtractive manufacturing for the workpiece is performed.

6. The processing machine according to claim 3, further comprising a tensioner that is mounted on the support and applies tension to the line body in a direction away from the additive-manufacturing head.

7. The processing machine according to claim 3, wherein the tool spindle is further movable in an axial direction of a third axis parallel to the vertical direction, and the processing machine further comprises a first guide that is connected to the additive-manufacturing head so as to be able to revolve about a first revolving axis parallel to the first axis, is connected to the support so as to be able to revolve about a second revolving axis parallel to the first axis, and guides the line body between the additive-manufacturing head and the support.

8. The processing machine according to claim 7, wherein the first guide includes an expansion and contraction mechanism that expands and contracts such that a distance between the first revolving axis and the second revolving axis changes.

9. The processing machine according to claim 7, wherein the tool spindle is turnable about a turning axis parallel to the axial direction of the second axis, the processing machine further comprises a second guide that is provided between the additive-manufacturing head and the first guide on a path on which the line body is routed and that guides the line body extending from the additive-manufacturing head along a circumferential direction of the turning axis and the second guide revolves relative to the tool spindle about the turning axis so as to maintain a posture of the turning axis in the circumferential direction during the turning of the tool spindle.

10. The processing machine according to claim 1, further comprising a splash guard including first to fourth planes, wherein the first plane faces the second plane in the axial direction of the first axis, the third plane faces the fourth plane in the axial direction of the second axis, the maximum movement amount of the tool spindle in the axial direction of the first axis is from a first closest possible point to a second closest possible point, the tool spindle is configured to come capably to the first closest possible point being closest to the first plane, the tool spindle is configured to come capably to the second closest possible point being closest to the second plane, the maximum movement amount of the tool spindle in the axial direction of the second axis is from a third closest possible point to a fourth closest possible point, the tool spindle is configured to come capably to the third closest possible point being closest to the third plane, and the tool spindle is configured to come capably to the fourth closest possible point being closest to the fourth plane.

* * * * *